United States Patent
Gailus et al.

(10) Patent No.: US 9,112,567 B2
(45) Date of Patent: Aug. 18, 2015

(54) APPARATUS AND METHOD FOR COMPENSATION OF AM NOISE IN RFID DEVICES THROUGH MODULATION OF A RECEIVED SIGNAL

(71) Applicant: MOTOROLA SOLUTIONS, INC, Schaumburg, IL (US)

(72) Inventors: Paul H Gailus, Prospect Heights, IL (US); Lawrence M Ecklund, Wheaton, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 43 days.

(21) Appl. No.: 14/083,916

(22) Filed: Nov. 19, 2013

(65) Prior Publication Data

US 2015/0139369 A1 May 21, 2015

(51) Int. Cl.
*H04B 1/10* (2006.01)

(52) U.S. Cl.
CPC ....................................... *H04B 1/10* (2013.01)

(58) Field of Classification Search
CPC .......... H04B 5/00; H04B 5/0062; H04B 5/02; H04B 1/0475; H04B 1/02; H04B 1/06; H04B 1/10
USPC .......... 375/346, 219, 221, 295, 316, 296, 345
See application file for complete search history.

(56) References Cited

U.S. PATENT DOCUMENTS

| | | | |
|---|---|---|---|
| 5,446,761 A * | 8/1995 | Nag et al. | 375/317 |
| 7,471,204 B2 | 12/2008 | Safarian et al. | |
| 7,671,720 B1 * | 3/2010 | Martin et al. | 340/10.1 |
| 7,986,931 B2 | 7/2011 | Lin et al. | |
| 8,000,674 B2 | 8/2011 | Sajid et al. | |
| 8,120,464 B2 * | 2/2012 | Bang et al. | 340/10.1 |
| 8,226,003 B2 | 7/2012 | Frederick et al. | |
| 8,260,241 B1 | 9/2012 | Hyde | |
| 8,340,581 B2 | 12/2012 | Smith | |
| 8,400,272 B2 | 3/2013 | Duron et al. | |
| 8,666,323 B2 * | 3/2014 | Lee et al. | 455/67.14 |
| 2005/0073949 A1 * | 4/2005 | Hayashi | 370/208 |
| 2006/0098765 A1 * | 5/2006 | Thomas et al. | 375/346 |
| 2006/0242220 A1 * | 10/2006 | Shehata et al. | 708/650 |
| 2009/0213770 A1 * | 8/2009 | Mu | 370/281 |
| 2010/0045435 A1 | 2/2010 | Duron et al. | |
| 2011/0133890 A1 | 6/2011 | Duron et al. | |
| 2011/0216815 A1 * | 9/2011 | Choi et al. | 375/219 |

FOREIGN PATENT DOCUMENTS

| | | |
|---|---|---|
| WO | 0021204 A1 | 4/2000 |
| WO | 2009097620 A1 | 8/2009 |

* cited by examiner

*Primary Examiner* — Siu Lee (57) ABSTRACT

A method and apparatus for compensation of noise in a Radio Frequency Identification (RFID) device through modulation of a received signal is described. The method includes determining an amplitude signal proportional to an amplitude of a transmitter signal and associated noise; processing the amplitude signal to derive a correction signal; and modulating a received signal during a receive period with the correction signal to substantially remove the associated noise from the received signal. An RFID device and an RFID transceiver integrated circuit (IC) are also described.

18 Claims, 8 Drawing Sheets

APPARATUS AND METHOD FOR COMPENSATION OF AM NOISE IN RFID DEVICES THROUGH MODULATION OF A RECEIVED SIGNAL

BACKGROUND OF THE INVENTION

The present disclosure relates generally to Radio Frequency Identification (RFID). In passive RFID, an RFID reader interrogates a passive tag using a transmitter that emits a carrier signal which the tag modulates by varying its reflection coefficient. Because of limited coupler directivity, antenna mismatch, and reflections from the environment, a portion of the transmitted signal (aka self-blocker) enters a receiver in the RFID reader. Therefore, the noise on the transmitted signal can degrade receiver sensitivity and hence the range of the RFID reader. Phase noise on the blocker signal is more tolerable than amplitude modulation (AM) noise as long as this phase noise is correlated with that of the receiver local oscillator (LO) signal. Designs take advantage of this fact by utilizing the same synthesizer for receiver and transmitter so that the higher noise of a fully integrated synthesizer can be tolerated. However, there is no rejection to AM noise, and to reduce it to an acceptable level a very high signal-to-noise ratio must be created and then maintained throughout the transmitter chain. The earlier stages in the transmitter gain lineup can often dominate the total noise. As a result, the digital-to-analog (D/A) converters, baseband gain, low-pass filtering, and modulator stages must be allocated a high current drain. It is also technically challenging to achieve required signal-to-noise levels.

In reader-to-reader interference scenarios, the phase noise of the transmitter and the receiver LO are not correlated so there is no phase noise rejection at the receiver. As a result, the transmitter phase noise will typically dominate over the AM noise as a source of reader-to-reader interference, particularly for nearby channels. Hence, the main problem with transmitter AM noise is its impact on the co-located receiver, especially because the self-blocker is always present at some level. Therefore, mitigating the effect of transmitter AM noise on the reader's own receiver would address the primary concern with AM noise.

Conventional methods for cancellation of the blocker signal are known and can be effective in reducing the impact of the blocker's noise and carrier on the receiver. However, cancellers add sufficient cost and complexity that they're typically only used for higher end products. Also, to be fully effective cancellers must track any changing signal reflections from the environment which can be challenging.

Accordingly, there is a need for an apparatus and method for compensation of AM noise in RFID devices through modulation of a received signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for compensation of noise in a Radio Frequency Identification (RFID) device through modulation of a received signal includes determining an amplitude signal proportional to an amplitude of a transmitter signal and associated noise; processing the amplitude signal to derive a correction signal; and modulating a received signal during a receive period with the correction signal to substantially remove the associated noise from the received signal.

In another exemplary embodiment, a Radio Frequency Identification (RFID) device includes a transmitter; a receiver; a directional coupler coupling the transmitter and the receiver to an antenna; a noise compensation function comprising circuitry configured to: determine an amplitude signal proportional to an amplitude of a transmitter signal and associated noise from the transmitter; process the amplitude signal to derive a correction signal; and modulate a received signal during a receive period from the receiver with the correction signal to substantially remove the associated noise from the received signal.

In yet another exemplary embodiment, a Radio Frequency Identification (RFID) transceiver integrated circuit includes a transmitter; a receiver, wherein each of the transmitter and the receiver are configured to utilize a same antenna; a noise compensation function comprising circuitry configured to: determine an amplitude signal proportional to an amplitude of a transmitter signal and associated noise from the transmitter; process the amplitude signal to derive a correction signal; and modulate a received signal during a receive period from the receiver with the correction signal to substantially remove the associated noise from the received signal.

In various exemplary embodiments, an apparatus and method for compensation of AM noise in RFID through modulation of a received signal is described. The apparatus and method reduce AM noise on a self-blocker signal coupled from a transmitter to a receiver of an RFID reader unit, thereby reducing the degradation in receive sensitivity from the noise. This allows the transmitter to have a higher level of AM noise before impacting the sensitivity of the reader's receiver. As a result, the required signal-to-noise ratio and current drain of at least the baseband section of the transmitter lineup can be reduced.

The apparatus and method apply modulation to a self-blocker signal in an RFID receiver to reduce its AM noise based on a sample of the transmitter signal's amplitude noise. This avoids the circuit switching or reconfiguration in the transmitter path that would be needed if such a correction was attempted within the transmitter. Such reconfiguration would be required to disable the correction and allow transmitter data modulation to occur as needed. Because the apparatus and method apply a correction only at the receiver, no transmitter circuit reconfiguration that could cause off-channel splatter or other transmitter issues can occur. The modulation index of the correction applied to the receiver signal to compensate AM noise is so small that it has essentially no effect on the received tag signal. Because the noise correction is multiplicative, no re-adjustment of the correction circuit is required if the level or phasing of blocker signal changes due to movement of the reader, etc., unlike conventional cancellation approaches for the received blocker.

Figure 1:
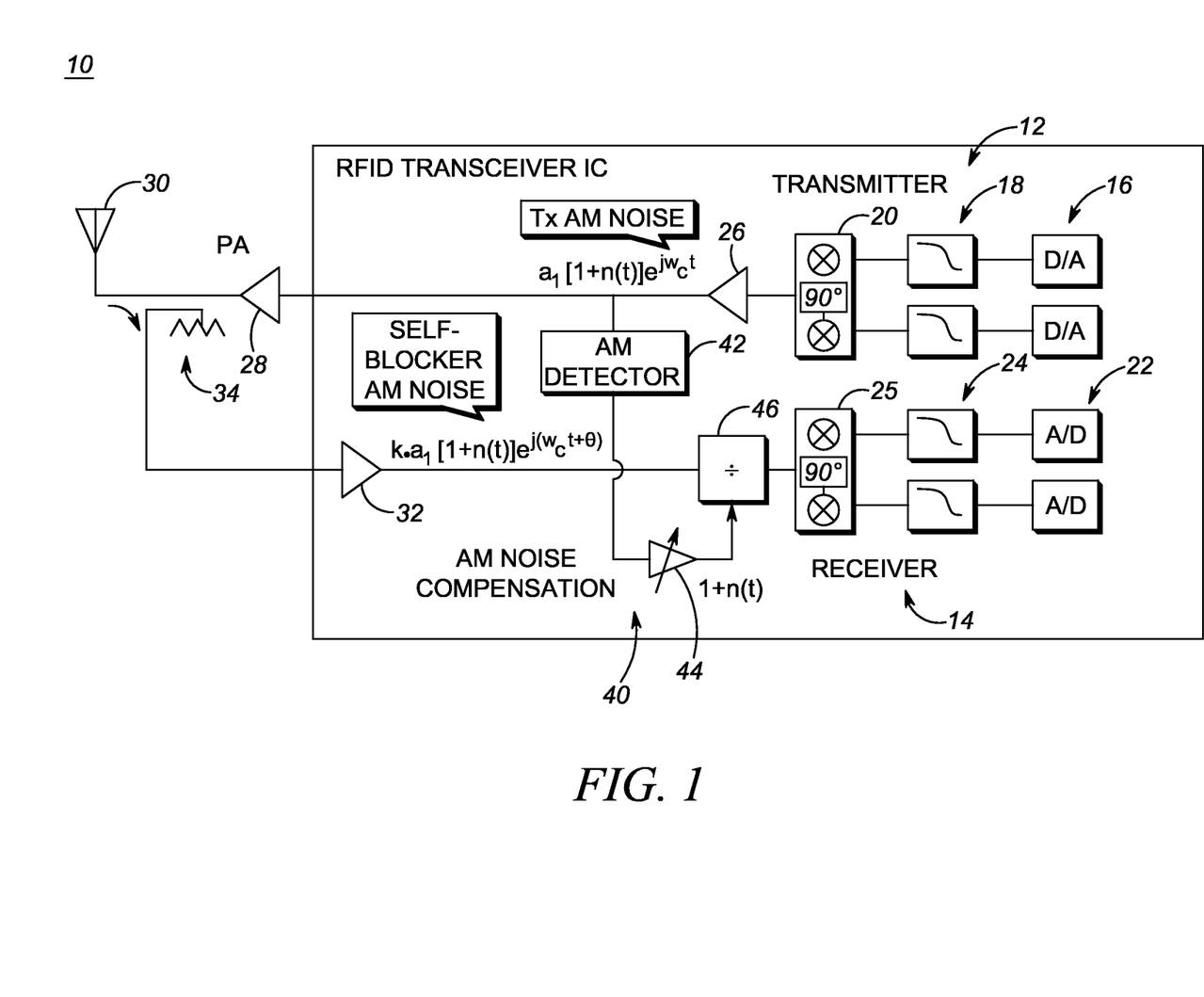
FIG. 1 is a block diagram of a RFID transceiver with a divider circuit in accordance with some embodiments.

FIG. 1 is a block diagram of a RFID transceiver 10 in accordance with some embodiments. The RFID transceiver 10 includes a transmitter 12 and a receiver 14. The transmitter 12 includes digital-to-analog (D/A) converters 16 receiving a data stream for in-phase (I) and quadrature (Q) components, filters 18, and a modulator 20. The receiver 14 includes analog-to-digital (A/D) converters 22 receiving an analog input from in-phase (I) and quadrature (Q) components, filters 24, and a demodulator 25. The modulator 20 outputs a modulated signal to an amplifier 26 which can be expressed as: $a_1[1+n(t)]e^{j\omega_c t}$, with the term n(t) representing the transmitter AM noise and the AM noise factor 1+n(t) representing modulation of the transmitter signal by the transmitter AM noise. The amplifier 26 outputs the modulated signal to another amplifier 28 which connects to an antenna 30 for transmission. On the receive side, the antenna 30 connects a received signal to an amplifier 32, and the antenna 30 can be coupled to both the receiver 14 and the transmitter 12 via a coupling device 34, such as a directional coupler, circulator, or the like. The received signal can be expressed as: $k \cdot a_1[1+n(t)]e^{j(\omega_c t+\theta)}$, again with the term n(t) representing the transmitter AM noise present in the received signal and the same AM noise factor 1+n(t) also representing modulation of the self-blocker signal by the transmitter AM noise.

In various exemplary embodiments, the RFID transceiver 10 includes an AM noise compensation function 40 which applies modulation to reduce the n(t) term, i.e. the AM noise, in the received signal based on a sample of the transmitter signal's amplitude noise. The AM noise compensation function 40 includes an AM detector 42 coupled to a point in the transmitter lineup which allows a sufficiently accurate sample of the transmitter noise, such as an output of the amplifier 26. The output of power amplifier 28 will provide an accurate sample of the noise, but an output of an earlier stage such as amplifier 26 will typically provide sufficient accuracy and also be more suitable for incorporation in an integrated circuit. The noise can be sampled at the earlier stages because most of the contributions to transmitter noise typically occur at the earlier and lower power stages of the transmitter lineup. The AM detector 42 is configured to detect the 1+n(t) term and create an amplitude signal proportional to the amplitude of the transmitted signal and its noise, i.e. $a_1[1+n(t)]e^{j\omega_c t}$. The AM detector 42 can create the amplitude signal either from the transmitter baseband path outputs or by detection at RF.

The AM detector 42 outputs the amplitude signal to a programmable gain stage 44. The programmable gain stage 44 provides a signal output substantially equivalent to the AM noise factor 1+n(t), to a processing circuit 46. After amplification in the programmable gain stage 44, the amplitude signal is processed by the processing circuit 46 to create a correction signal that is inversely proportional to the amplitude and modulated onto the received signal. In the exemplary embodiment of FIG. 1, the processing circuit 46 can include a divider circuit to remove the AM noise modulation of the self-blocker by AM noise factor 1+n(t) from the received signal. In another exemplary embodiment, illustrated in FIG. 2, the processing circuit 46 can include a multiplier circuit for a simpler circuit implementation.

Figure 2:
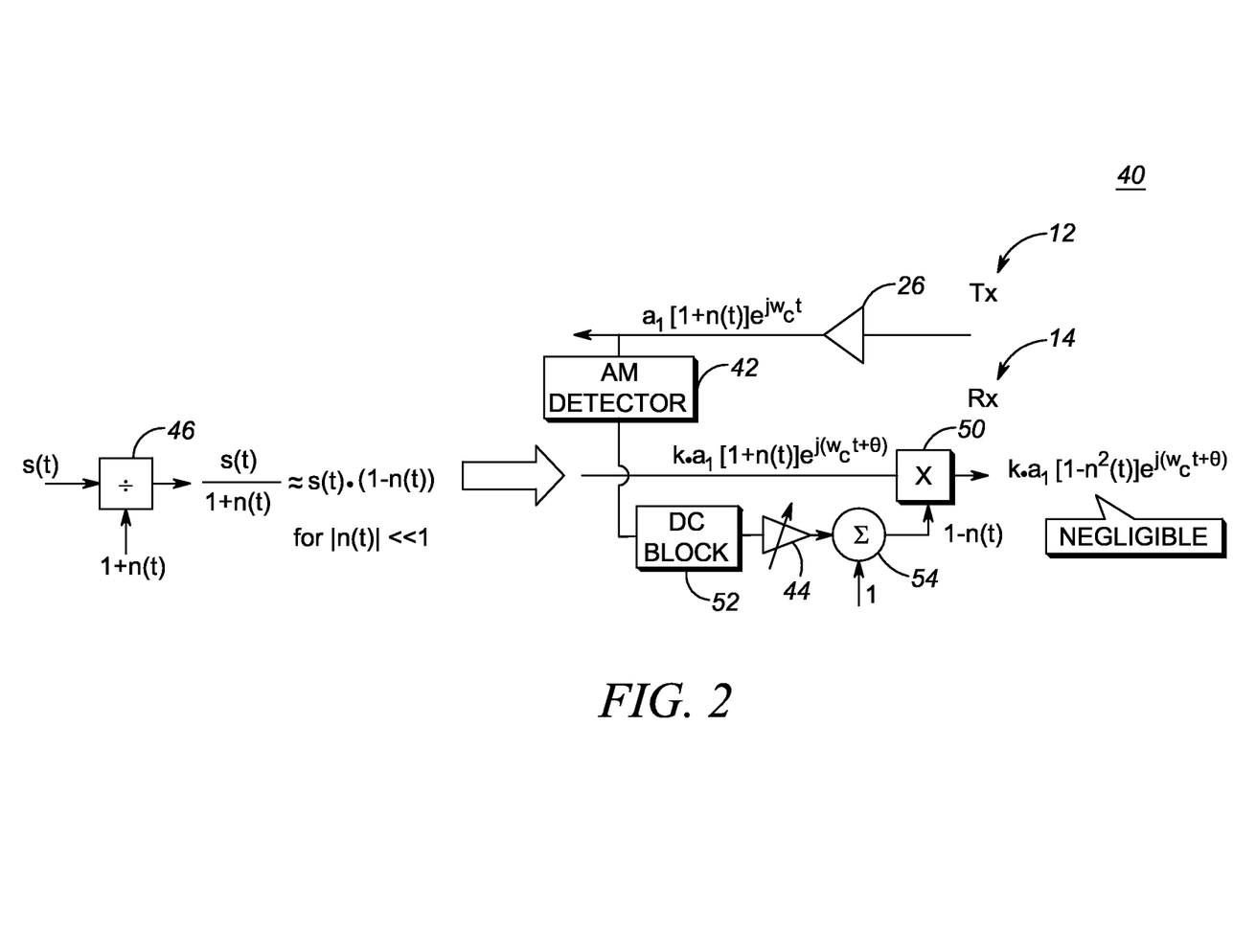
FIG. 2 is a block diagram of a multiplier circuit for substitution of the divider circuit in the RFID transceiver of FIG. 1 in accordance with some embodiments.

FIG. 2 is a block diagram of a multiplier circuit for substitution of the divider circuit in the RFID transceiver 10 in accordance with some embodiments. First, in FIG. 2, the divider circuit as the processing circuit 46 is illustrated with an input, s(t), and the AM noise factor, 1+n(t), providing an output of s(t)/(1+n(t)). This approximately equals s(t)×(1−n(t)) when the magnitude of n(t) is significantly less than 1 as expected with the noise term. Accordingly, the AM noise compensation function 40 can be constructed with a multiplier circuit 50 in instead of the divider circuit for the processing circuit 46. Here, the AM detector 42 outputs the amplitude signal to a DC block 52 prior to the programmable gain stage 44. An output of the programmable gain stage 44 is combined via a summing block 54 to derive the term 1−n(t) which is input to the multiplier circuit 50 which outputs a signal which can be described as $k \cdot a_1[1-n^2(t)]e^{j(\omega_c t+\theta)}$. Since the magnitude of $n^2(t)$ is negligible compared to the magnitude of n(t), the AM noise is therefore substantially eliminated.

The RFID transceiver 10 can also be used variously in an RFID device, an RFID reader, a reader, interrogator, etc. Alternatively, the RFID transceiver 10 can be referred to as an RFI device. Further, the various components in FIGS. 1 and 2 with respect to the AM noise compensation function 40 can be implemented in an integrated circuit (IC) along with various components associated with the transmitter 12 and the receiver 14.

During the reader's receive period (no Tx data modulation), the received RF signal (including the blocker and desired TAG signals) is multiplied by the correction signal thereby reducing the AM noise on the received blocker signal. The invention effectively applies an inverse modulation to "undo" the noise modulation, instead of doing an additive cancellation of signal vectors as in prior art. The percentage of inverse modulation required is independent of the level and the phasing of the blocker signal entering the receiver, because this percentage is determined by the level of noise modulation relative to the carrier in the transmitter. Because the correction is done using a multiplicative process in the modulation domain instead of a vector addition of RF signals, it does not need to be re-adjusted if the level or phasing of the reflected blocker signal changes.

Typically most of the Tx AM noise will result from the earlier stages in the Tx gain lineup, especially if the allocated current drain is reduced as a result of the greater tolerance to AM noise provided by this invention. Therefore a sample of the Tx baseband output may provide a good approximation of the transmitted AM noise signal. If not, envelope detection of the transmitter RF signal can be used.

Figure 3:
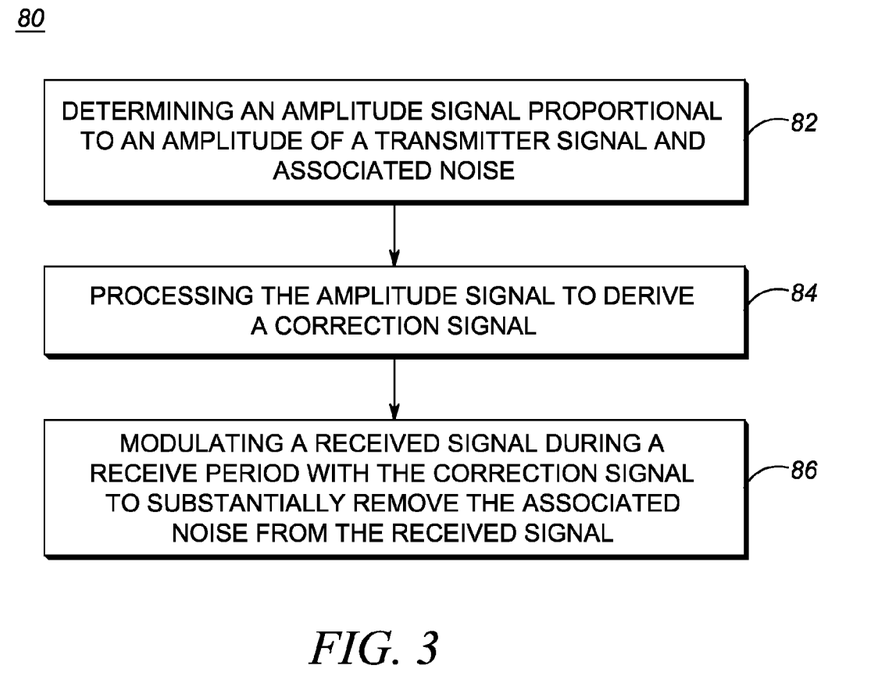
FIG. 3 is a flow chart of a method for compensation of noise in an RFID device through modulation of a received signal in accordance with some embodiments.

FIG. 3 is a flow chart of a method 80 for compensation of noise in a Radio Frequency Identification (RFID) device through modulation of a received signal in accordance with some embodiments. The method 80 contemplates operation in the RFID transceiver 10, RFID readers, RFID interrogators, etc. The method 80 includes determining an amplitude signal proportional to an amplitude of a transmitter signal and associated noise (step 82). For example, the amplitude signal can be determined by the AM detector 42. Note, the amplitude signal includes the amplitude of the transmitter signal and associated noise, i.e. 1+n(t).

The method 80 includes processing the amplitude signal to derive a correction signal (step 84). In an exemplary embodiment, the method 80 can include processing the amplitude signal to derive the correction signal inversely proportional to the amplitude signal. The method 80 includes modulating a received signal during a receive period with the correction signal to substantially remove the associated noise from the received signal (step 86). In an exemplary embodiment, the method 80 includes, when the correction signal is inversely proportional to the amplitude signal, modulating the received signal by multiplying the received signal by the correction signal to reduce the associated noise on the received signal.

In another exemplary embodiment, the method 80 can include modulating the received signal by dividing the received signal by the correction signal to reduce the associated noise on the received signal. The percentage of modulation required is independent of a level and phasing of the received signal, and the method 80 can further include continuing the modulating regardless of changes in the level and the phasing of the received signal.

Optionally, the method 80 can include determining the amplitude signal either by processing a baseband signal or detecting the amplitude signal at RF. The method 80 can further include processing the amplitude signal to derive the correction signal through a programmable stage that amplifies the amplitude signal and creates the correction signal. The method 80 can also include adjusting the programmable stage during a calibration such that modulation applied to the transmitter is removed from the received signal. The method 80 can include modulating the received signal through continuously variable gain in a receiver RF path which is controlled by the correction signal to apply a compensating amplitude modulation to the received signal. The continuously variable gain can be utilized to provide the multiplication or division described herein.

The method 80 reduces AM noise on a self-blocker signal coupled from the transmitter to receiver of an RFID reader unit, thereby reducing the degradation in receive sensitivity from the noise. Because the noise correction with the method 80 is applied at the receiver, no changes to normal transmitter operation are required. This avoids any changes or transitions in the transmitter between modulated and un-modulated modes that could cause off-channel emissions. Further, the method 80 also relaxes the transmitter AM noise requirement, allowing a corresponding reduction in current drain. This allows the transmitter to have a higher level of AM noise before impacting the sensitivity of the reader's receiver. As a result, the required signal-to-noise ratio and current drain of the transmitter lineup can be reduced.

Unlike known cancellation approaches of the received blocker noise, the method 80 does not have to track changes in the level or phase of the reflected signal at the antenna port. This is because the noise correction is applied using multiplication (or division) of signals in the modulation domain, instead of vector cancellation of the signals. In other words, the method 80 applies a reverse modulation to "undo" the noise modulation. As a result, the method 80 is robust to changing conditions in the RF path.

With respect to the RFID transceiver 10, the method 80 can be implemented in the AM noise compensation function 40 comprising circuitry configured to: determine an amplitude signal proportional to an amplitude of a transmitter signal and associated noise from the transmitter block; process the amplitude signal to derive a correction signal; and modulate a received signal during a receive period from the receiver block with the correction signal to substantially remove the associated noise from the received signal.

FIGS. 4-8 illustrate the RFID transceiver 10 using various exemplary embodiments. Those of ordinary skill in the art will recognize the RFID transceiver 10 and the method 80 contemplate other embodiments and the exemplary embodiments of FIGS. 4-8 are described for illustration purposes. Again, in various exemplary embodiments, the approaches of FIGS. 4-8 reduce AM noise on a self-blocker signal coupled from the transmitter to receiver of an RFID reader unit, thereby reducing the degradation in receive sensitivity from the noise. These approaches allow the transmitter to have a higher level of AM noise before impacting the sensitivity of the reader's receiver.

Figure 4:
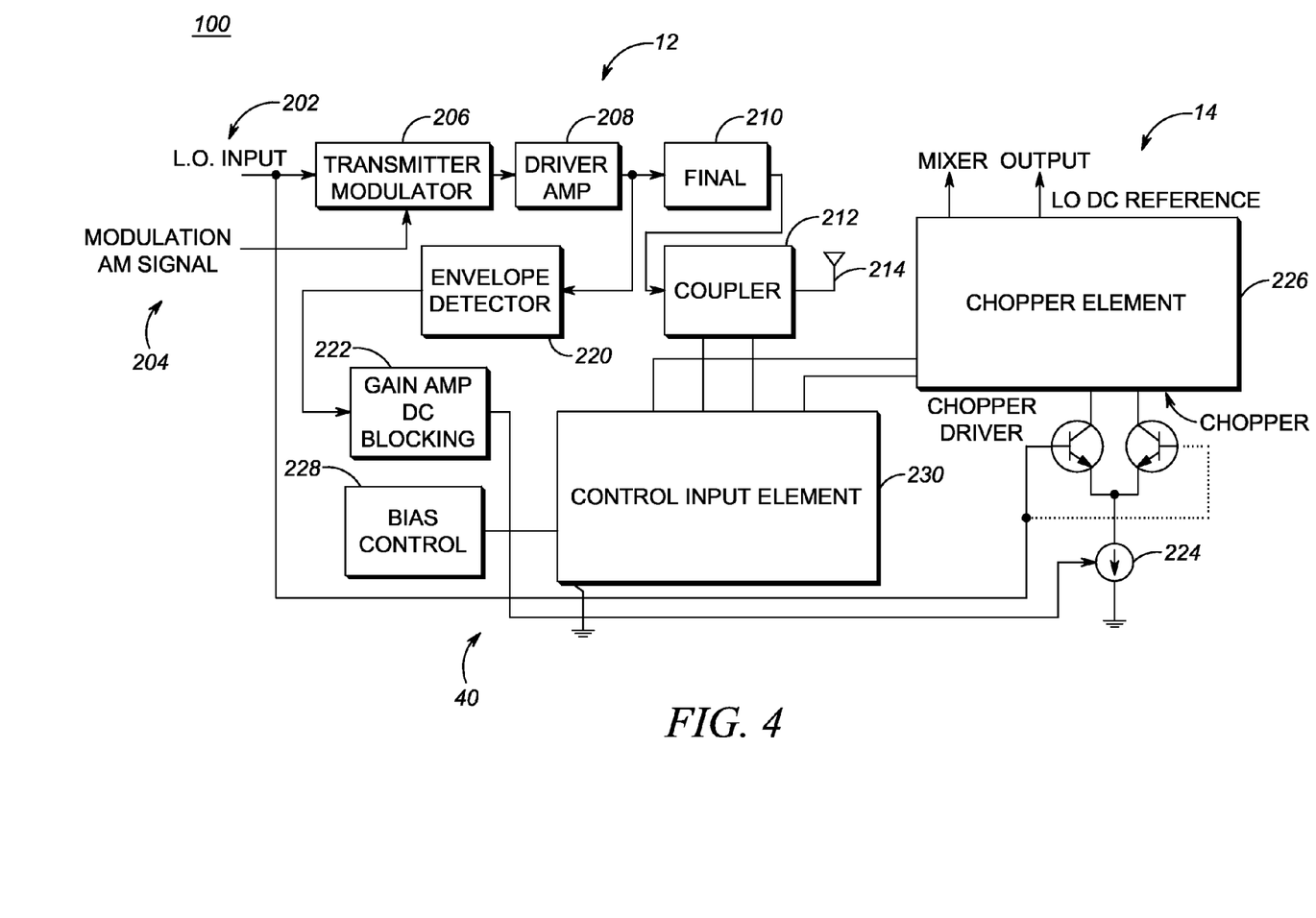
FIG. 4 illustrates a schematic diagram of a Parasitic LO Multiplier Gilbert cell approach for the RFID transceiver of FIGS. 1 and 2 in accordance with some embodiments.
Figure 5:
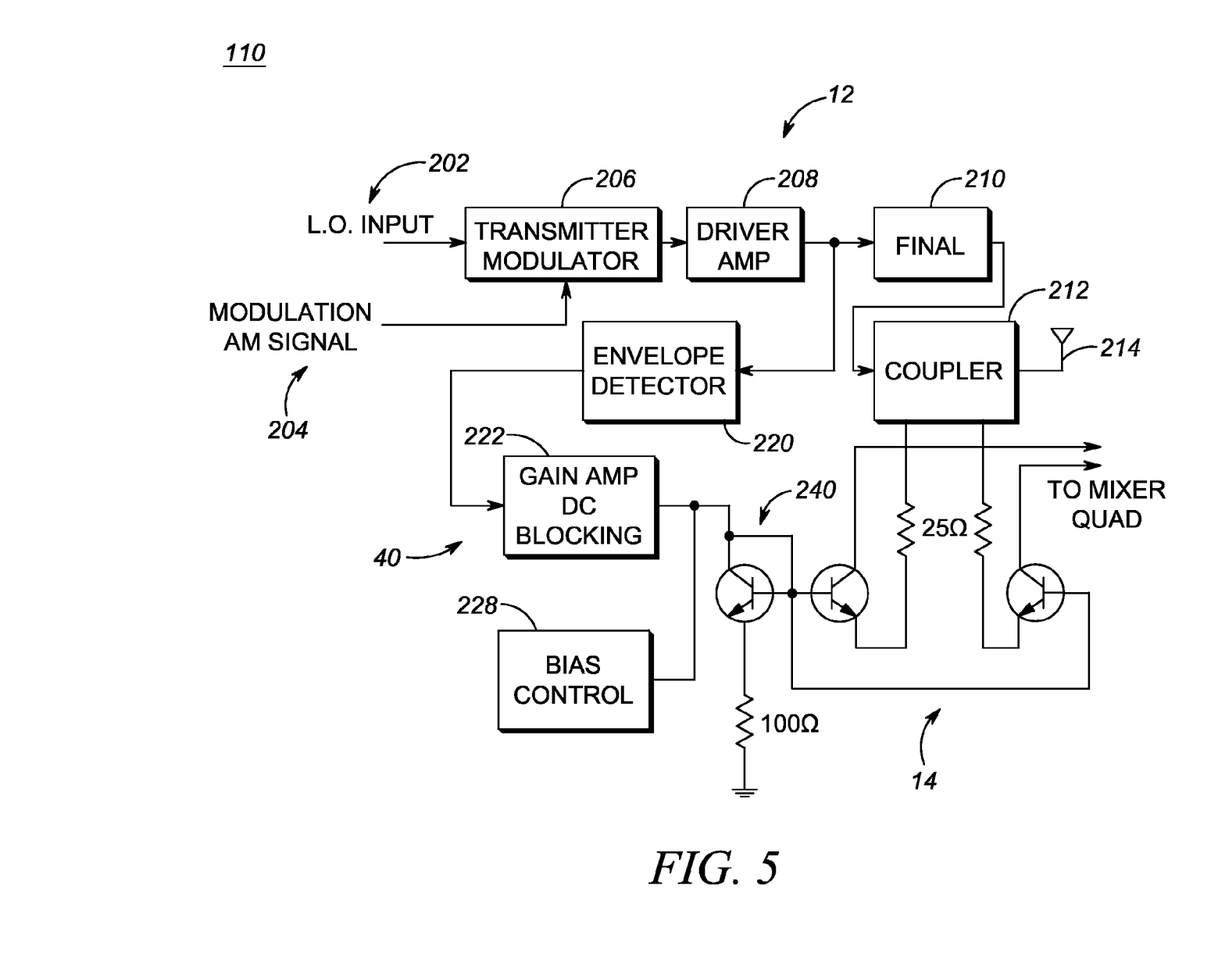
FIG. 5 illustrates a schematic diagram of a Parasitic RF input Multiplier Gilbert cell approach for the RFID transceiver of FIGS. 1 and 2 in accordance with some embodiments.
Figure 6:
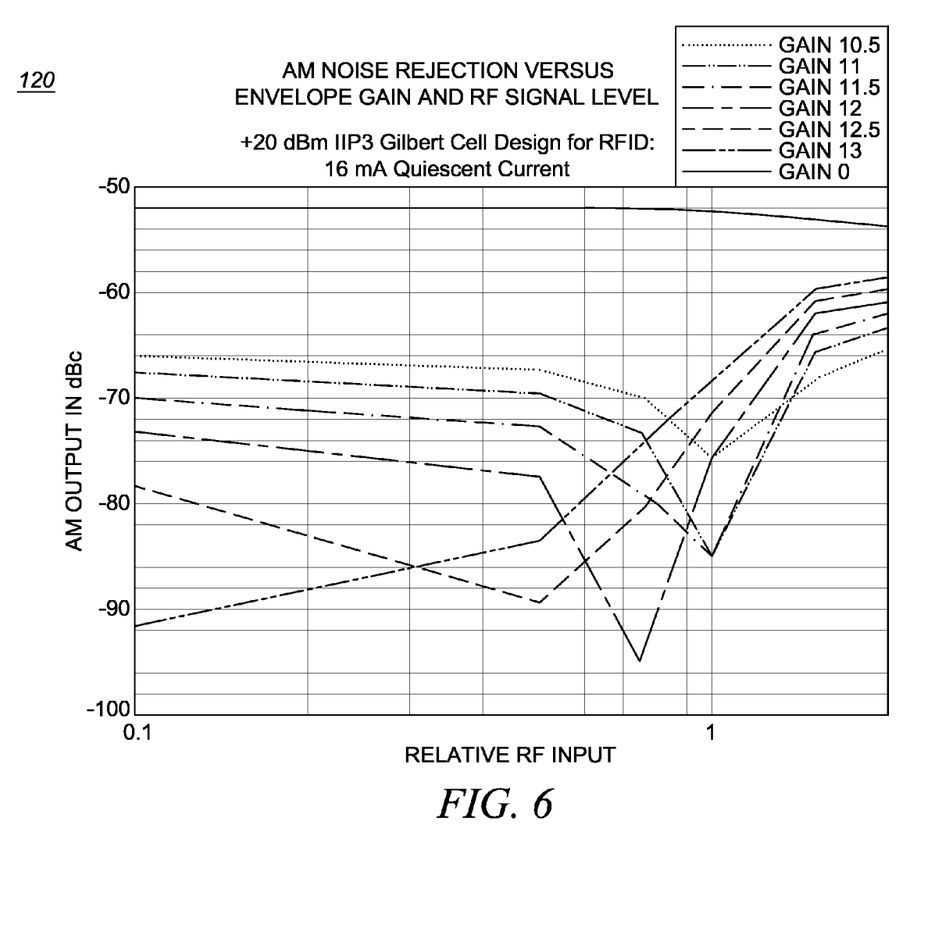
FIG. 6 illustrates a graph of AM noise reduction versus envelope gain and RF signal level for the Parasitic RF input Multiplier Gilbert cell approach in accordance with some embodiments.
Figure 7:
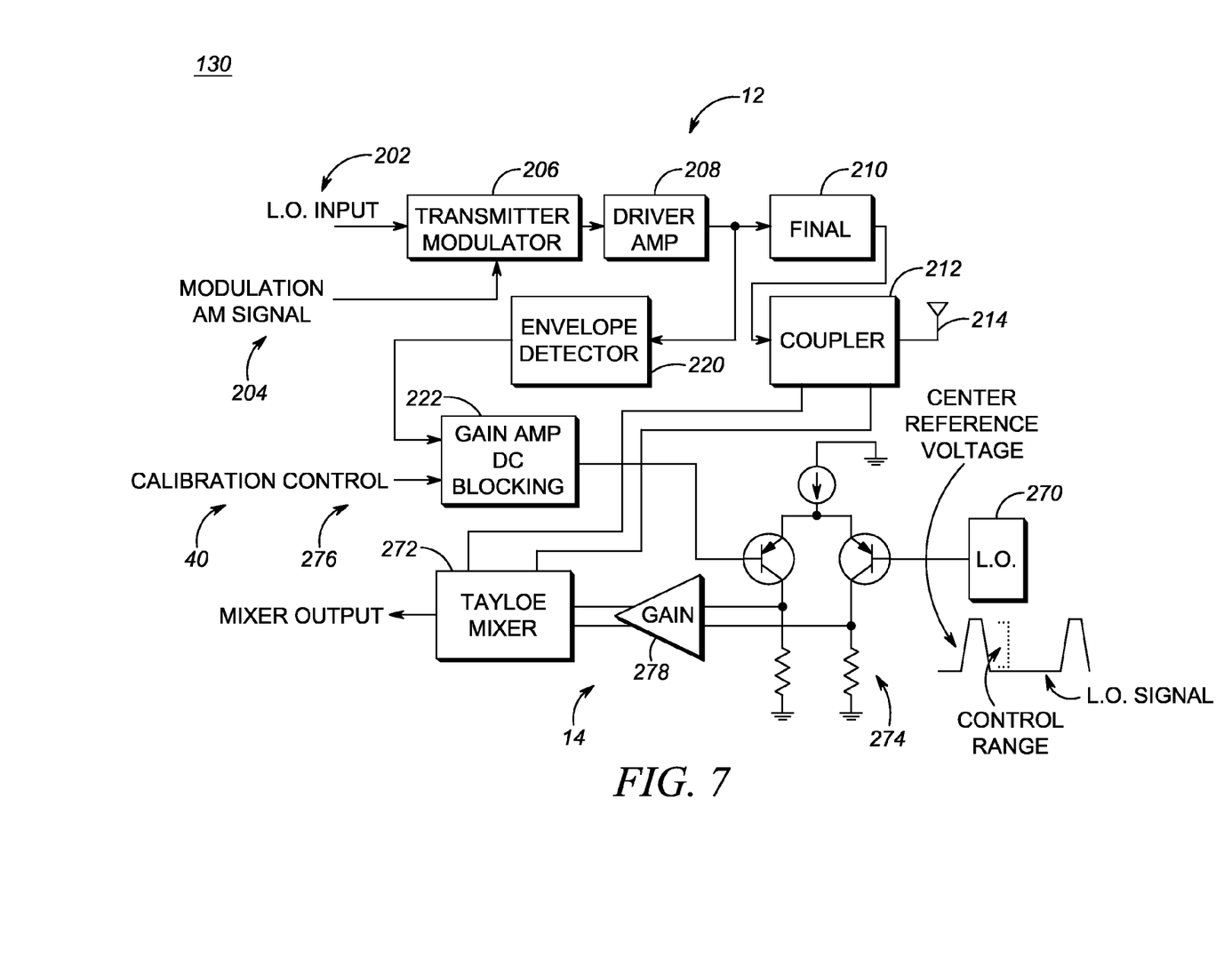
FIG. 7 illustrates a schematic diagram of a Parasitic Tayloe LO Multiplier approach for the RFID transceiver of FIGS. 1 and 2 in accordance with some embodiments.
Figure 8:
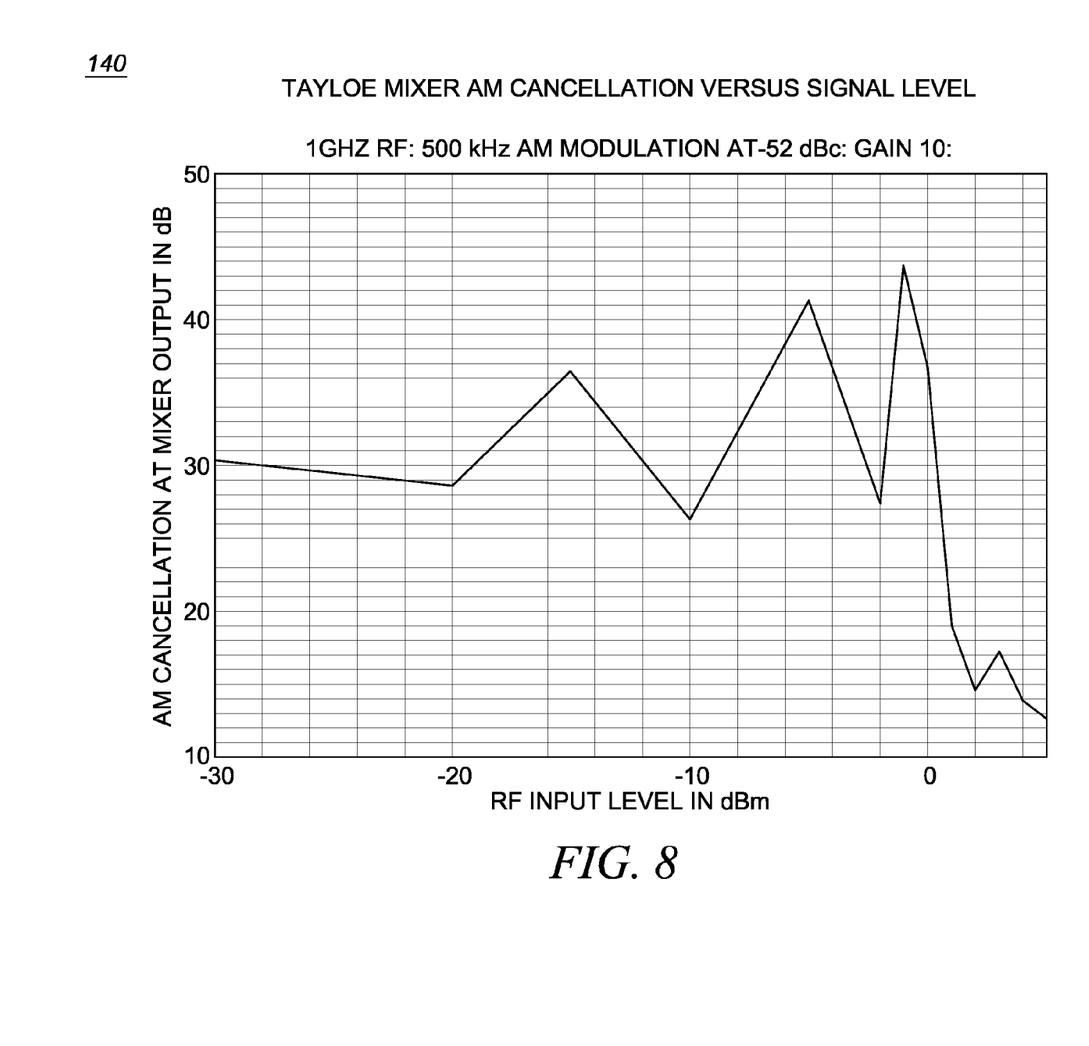
FIG. 8 illustrates a graph of a Tayloe mixer AM cancellation versus signal level for the Parasitic Tayloe LO Multiplier approach in accordance with some embodiments.

FIG. 4 illustrates a schematic diagram of a Parasitic LO Multiplier Gilbert cell approach 100 for the RFID transceiver 10. FIG. 5 illustrates a schematic diagram of a Parasitic RF input Multiplier Gilbert cell approach 110 for the RFID transceiver 10. FIG. 6 illustrates a graph 120 of AM noise reduction versus envelope gain and RF signal level for the Parasitic RF input Multiplier Gilbert cell approach 110. FIG. 7 illustrates a schematic diagram of a Parasitic Tayloe LO Multiplier approach 130 for the RFID transceiver 10. FIG. 8 illustrates a graph 140 of Tayloe mixer AM cancellation versus signal level for the Parasitic Tayloe LO Multiplier approach 130.

The implementation approaches 100, 110, 130 for the compensation of the AM noise on RFID self-blocker by modulation of the received signal have in common for their front-end, one or more antenna matching elements, amplifiers, filters, a down-converter, an up converter, an envelope detector. The front-end receives an LO input 202 and an amplitude modulating signal 204 at a transmitter modulator 206.

Before describing embodiments of the present invention in detail, it is useful to explain that an amplitude signal proportional to the amplitude of the transmitter signal and its associated noise is created either from the transmitter baseband path outputs or by detection at in the RF portion of the transmitter chain. After amplification of this signal in a programmable gain stage, a correction signal inversely proportional to the amplitude is created.

Again, FIG. 4 is the Parasitic LO Multiplier Gilbert cell approach 100 with a basic Transmitter through Receiver Gilbert cell Output shown, Including Chopper Driver. The transmitter modulator 206 is receiving amplitude modulating signal 204. The amplitude modulating signal 204 is therefore transmitted to a driver amplifier 208 after the multiplication is accomplished in the transmitter modulator 206.

An output of the driver amplifier 208 is coupled to a Final amplifier 210 which is coupled to a directional coupler 212. The elements 206, 208, 210 are part of the transmitter 12 of the RFID transceiver 10. The directional coupler 212 connects to an antenna 214 that is used by both the transmitter 12 and the receiver 14.

The AM noise compensation function 40 includes an envelope detector 220 that receives a noisy leak signal from the driver amplifier 208. This noisy leak signal is proportional to the transmitter signal and the associated noise. The signal is of the form $[(A)_{n(t)}+1]\cos(\text{wct}+\emptyset)$. The envelope detector removes the $\cos(\text{wct}+\emptyset)$ and leaves the amplitude signal, $[(A)_{n(t)}+1]$ as the resultant term where $(A)_{n(t)}$ is the noise term The envelope signal is provided to a gain amplifier 222 that is used to feed a differential current drive source 224 and drive a chopper element 226. The voltage gain of the I mixer, as a demodulator, is defined as $[(A)_{n(t)}+1]\cos(\text{wct}+\emptyset)*K \cos(\text{wct}+\emptyset)$. After baseband filtering this becomes $[(A)_{n(t)}+1]*K$ where K is the amplitude defined by the differential current drive source 224. The known integrated circuit MC1595, originally sourced by Motorola, Inc., is an exemplary mixer for illustrating this attribute. The input element 230, which processes the RF signal and sets the unity control gain of the receiver and the chopper element 226 are part of the receiver 14.

Thus, the chopper element 226 is used to modulate the received signal from the antenna 214 during a receive period with a correction signal from the envelope detector 220 and the gain amplifier 222. Multiplication is accomplished by varying the control current of differential current drive source 224 driving the chopper element 226. This increases or decreases the LO voltage drive to the chopper element 226. Typically the mixer gain is relatively insensitive to LO amplitude. Therefore, a relatively large variation of LO voltage is required to induce even a small change in the mixer output. The LO drive signal to the chopper driver could be differential as shown in FIG. 4.

FIG. 5 is a schematic diagram of the Parasitic RF input Multiplier Gilbert cell approach 110. The Parasitic RF input Multiplier Gilbert cell approach 110 includes the same components 202, 204, 206, 208, 210, 212, 214, 220, 222, 228 as the Parasitic LO Multiplier Gilbert cell approach 100. The Parasitic RF input Multiplier Gilbert cell approach 110 is another implementation approach for reducing AM noise on a self-blocker signal coupled from the transmitter to receiver of an RFID self-blocker reader unit, thereby reducing the degradation in receive sensitivity from the noise by including the parasitic RF input multiplier Gilbert cell.

The control parameters provided to control input elements 240 should be set to the amount that allows the transistor to remain in the operational range and having the required design control current needed. The Parasitic RF input Multiplier Gilbert cell approach 110 includes the basic transmitter through receiver input transistors. Signal and Bias current is supplied through 25 ohm resistors. Multiplication is accomplished by varying the Bias Current of the Input Transistors. FIG. 6 illustrates the graph 120 showing AM rejection versus RF input level versus gain. For example, 20 dB of rejection is shown over a normal RF blocker input signal level range for gain of 12.

FIG. 7 is a schematic diagram of a Parasitic Tayloe LO Multiplier approach 130. The Parasitic Tayloe LO Multiplier approach 130 includes the same components 202, 204, 206, 208, 210, 212, 214, 220, 222 as the Parasitic LO Multiplier Gilbert cell approach 100 and the Parasitic RF input Multiplier Gilbert cell approach 110. The another Parasitic Tayloe LO Multiplier approach 130 minimizes the noise power and reduces cost and by keeping constant the noise ratio by using a Tayloe LO parasitic on a self-blocker signal coupled from the transmitter to receiver of an RFID reader unit.

Here, the signal multiplication is accomplished by varying a pulse width of an LO signal 270 to a Tayloe Mixer 272. One embodiment is to use a threshold circuit element 274 to adjust the switching point of a pulse generation element for the LO signal 270. Since there is a rise and fall time on the LO signal, adjusting the voltage where the threshold circuit switches changes the width of the pulse driving the Tayloe mixer. Again, the noisy leak signal is detected by the envelope detector and converted into the amplitude only baseband signal. To compensate the noise at the receiver 14, the pulse width of the LO signal out of gain element 278 which is coupled to the LO input of the Tayloe Mixer is varied in width thereby changing the gain of the Tayloe mixer. This is done so that the gain on the Tayloe mixer varies inversely to the AM noise. FIG. 8 illustrates the graph 140 of Tayloe mixer AM cancellation versus signal level for the Parasitic Tayloe LO Multiplier approach 130. The gain is relatively insensitive to pulse width and 20 dB of rejection is provided over a desired range.

Advantageously, by compensating transmitter AM noise at the receiver, RFID reader range is improved while achieving: lower DC power than the brute-force approach for reducing transmitter AM noise (high current and low impedances); no modification to transmitter signal path other than allowing a relaxed the transmitter noise spec—avoids transients and other issues with approaches that must turn on and off an AM noise reduction circuit between unmodulated and modulated modes (e.g., AM feedback, selectable filtering, etc.); and lower cost and part count than vector cancellation of reflected blocker signal. The method and apparatus described herein can be implemented on a same IC as the transmitter and receiver thereby providing an integrated design.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for compensation of noise in a Radio Frequency Identification (RFID) device through modulation of a received signal, the method comprising:
    determining an amplitude signal proportional to an amplitude of a transmitter signal and associated noise;
    processing the amplitude signal to derive a correction signal through a programmable stage that amplifies the amplitude signal and creates the correction signal; and
    modulating a received signal during a receive period with the correction signal to substantially remove the associated noise from the received signal.

2. The method of claim 1, further comprising:
    processing the amplitude signal to derive the correction signal inversely proportional to an amplitude of the amplitude signal; and
    modulating the received signal by multiplying the received signal by the correction signal to reduce the associated noise on the received signal.

3. The method of claim 1, wherein a percentage of modulation required is independent of a level and phasing of the received signal, and further comprising:
    continuing the modulating regardless of changes in the level and the phasing of the received signal.

4. The method of claim 1, further comprising:
    performing the modulating at a receiver section; and preventing changes or transitions in a transmitter between modulated and un-modulated modes that cause off-channel emissions.

5. The method of claim 1, further comprising:
    modulating the received signal by dividing the received signal by the correction signal to reduce the associated noise on the received signal.

6. The method of claim 1, further comprising:
    determining the amplitude signal either by processing a baseband signal or detecting the amplitude signal at RF.

7. The method of claim 1, further comprising:
    adjusting the programmable stage during a calibration such that modulation applied to the transmitter is removed from the received signal.

8. The method of claim 1, further comprising:
    modulating the received signal through continuously variable gain in a receiver RF path which is controlled by the correction signal to apply a compensating amplitude modulation to the received signal.

9. The method of claim 1, further comprising:
    performing the modulating utilizing a parasitic LO multiplier Gilbert cell.

10. The method of claim 1, further comprising:
    performing the modulating utilizing a parasitic RF multiplier Gilbert cell.

11. The method of claim 1, further comprising:
    performing the modulating utilizing a parasitic Tayloe multiplier.

12. A Radio Frequency Identification (RFID) device, the RFID device comprising:
    a transmitter;
    a receiver;
    a coupling device coupling the transmitter and the receiver to an antenna;
    a noise compensation function comprising circuitry configured to:
        determine an amplitude signal proportional to an amplitude of a transmitter signal and associated noise from the transmitter;
        process the amplitude signal to derive a correction signal through a programmable stage that amplifies the amplitude signal and creates the correction signal; and
        modulate a received signal during a receive period from the receiver with the correction signal to substantially remove the associated noise from the received signal.

13. The RFID device of claim 12, wherein the circuitry is further configured to:
    process the amplitude signal to derive the correction signal inversely proportional to an amplitude of the amplitude signal; and modulate the received signal by multiplying the received signal by the correction signal to reduce the associated noise on the received signal.

14. The RFID device of claim 12, wherein the circuitry is further configured to:
modulate the received signal by dividing the received signal by the correction signal to reduce the associated noise on the received signal.

15. The RFID device of claim 12, wherein the circuitry is further configured to:
determine the amplitude signal either by processing a baseband signal or detecting the amplitude signal at RF.

16. The RFID device of claim 12, wherein the circuitry is further configured to:
adjust the programmable stage during a calibration such that modulation applied to the transmitter is removed from the received signal.

17. The RFID device of claim 12, wherein the circuitry is further configured to:
modulate the received signal through continuously variable gain in a receiver RF path which is controlled by the correction signal to apply a compensating amplitude modulation to the received signal.

18. A Radio Frequency Identification (RFID) transceiver integrated circuit, the RFID transceiver integrated circuit comprising:
a transmitter;
a receiver, wherein each of the transmitter and the receiver are configured to utilize a same antenna;
a noise compensation function comprising circuitry configured to:
determine an amplitude signal proportional to an amplitude of a transmitter signal and associated noise from the transmitter;
process the amplitude signal to derive a correction signal through a programmable stage that amplifies the amplitude signal and creates the correction signal; and
modulate a received signal during a receive period from the receiver with the correction signal to substantially remove the associated noise from the received signal.

* * * * *

UNITED STATES PATENT AND TRADEMARK OFFICE
CERTIFICATE OF CORRECTION

PATENT NO. : 9,112,567 B2
APPLICATION NO. : 14/083916
DATED : August 18, 2015
INVENTOR(S) : Gailus et al.

Page 1 of 1

It is certified that error appears in the above-identified patent and that said Letters Patent is hereby corrected as shown below:

On the title page item [71], insert --Symbol Technologies, LLC, Holtsville, NY--

Signed and Sealed this
Twenty-eighth Day of June, 2016

Michelle K. Lee
*Director of the United States Patent and Trademark Office*